(12) United States Patent
Swain et al.

(10) Patent No.: US 6,365,869 B1
(45) Date of Patent: Apr. 2, 2002

(54) APPARATUS FOR LASER PROCESSING FOIL MATERIAL

(75) Inventors: Robert Swain, Maynard; Xinbing Liu, Acton; Steven Sansone, Medway, all of MA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/636,784

(22) Filed: Aug. 11, 2000

(51) Int. Cl.$^7$ ............................................... B23K 26/00
(52) U.S. Cl. ............................................... 219/121.6
(58) Field of Search ........................ 219/121.6, 121.63, 219/121.67, 121.7, 121.82

(56) References Cited

U.S. PATENT DOCUMENTS 4,187,432 A   2/1980  Mileham
5,096,518 A * 3/1992  Fujikawa et al. ............. 156/89
5,883,356 A   3/1999  Bauer et al.

\* cited by examiner

*Primary Examiner*—Samuel M. Heinrich
(74) *Attorney, Agent, or Firm*—Ratner & Prestia

(57) ABSTRACT

Apparatus for laser processing a foil material workpiece held to a workpiece holder by a vacuum while being processed by a laser. The foil material workpiece spans a recess in the workpiece holder and is held flat and taut across the recess. With the open space beneath the foil material workpiece defined by the recess, the laser beam can pass completely through the foil material workpiece to form a through hole or through cut in the foil material workpiece without impinging on the workpiece holder.

18 Claims, 2 Drawing Sheets

APPARATUS FOR LASER PROCESSING FOIL MATERIAL

TECHNICAL FIELD

The present invention relates, in general, to laser machining and, in particular, to an apparatus and method for processing foil material with a laser.

BACKGROUND OF THE INVENTION

In laser drilling and cutting of foil-like materials, such as thin metal foils and plastic foils, the surfaces of the materials that are being processed should be flat and taut to provide a focal plane or image plane for the laser beam. Because these materials are light and flimsy, holding them properly can be difficult.

One way of holding these light and flimsy materials flat and taut is by the application of a vacuum through holes in a bed or workpiece holder on which these light and flimsy materials are laid. Typically, these workpiece holders are solid and present a planar surface onto which the foil material workpiece to be machined is laid and the foil material workpiece is held in place by the vacuum.

One common laser machining operation is drilling a blind hole in the foil material workpiece (i.e., a hole that is not a through hole that extends completely through the workpiece). For such laser machining operations, where the laser beam does not pass completely through the foil material workpiece, an arrangement that includes a bed having a planar surface on which the foil material workpiece is held is fine. If, however, a through hole or a through cut is to be formed in the foil material workpiece, the laser beam must pass completely through the foil material workpiece and can impinge on the planar surface of the workpiece holder on which the foil material workpiece is being held. When the laser beam impinges on the planar surface of the workpiece holder, small crater-like formations are developed. As a result, the surface on which the foil material workpiece is being held is no longer planar and the workpiece no longer is held flat against the workpiece holder throughout the extent of the foil material workpiece.

SUMMARY OF THE INVENTION

Accordingly, apparatus for laser processing a foil material workpiece, constructed in accordance with the present invention, includes a laser unit for developing a laser beam for processing a foil material workpiece. Also included in this apparatus is a workpiece holder that is adapted to hold a foil material workpiece and is disposed in the path of the laser beam. This workpiece holder has a recess in a first face that extends into the workpiece holder and a groove in the first face between the recess and a sidewall at the periphery of the workpiece holder. The workpiece holder also has a vacuum passage extending through the workpiece holder and opening at a first end into the groove. Apparatus for laser processing a foil material workpiece, constructed in accordance with the present invention, further includes means for applying a vacuum to a second end of the vacuum passage in the workpiece holder.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
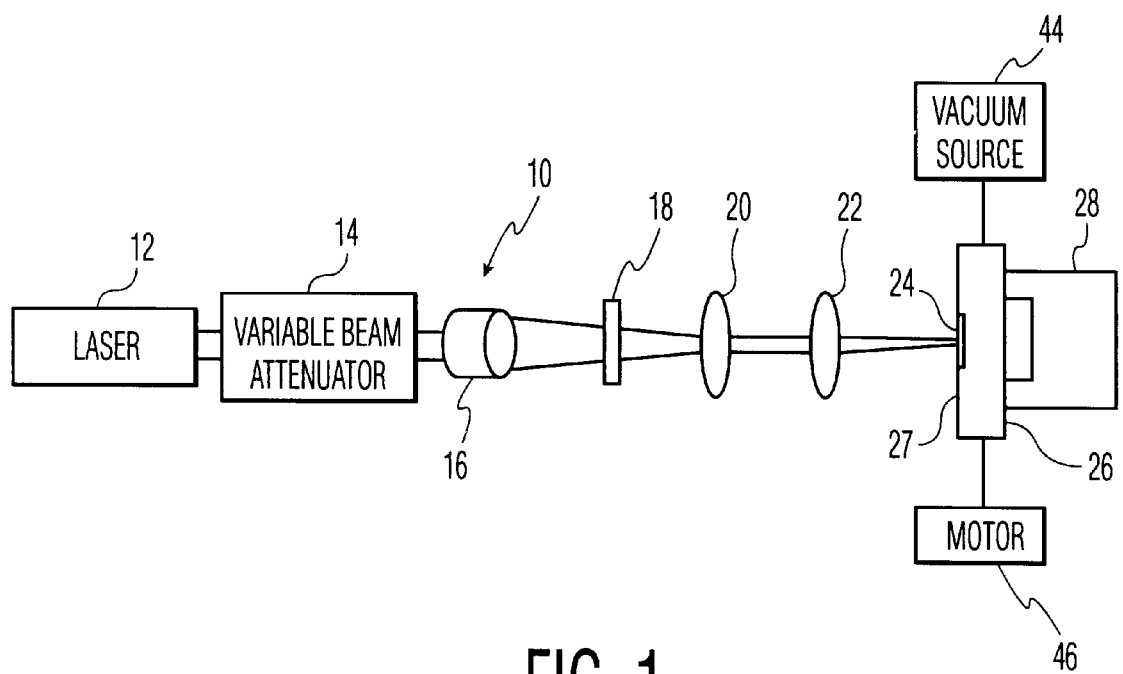
FIG. 1 is a block diagram of a preferred embodiment of apparatus for laser processing a foil material workpiece constructed in accordance with the present invention.

Referring to FIG. 1, apparatus for laser processing a foil material workpiece, constructed in accordance with the present invention, includes a laser unit 10 for developing a laser beam for processing a foil material workpiece. For the embodiment of the invention being described, laser unit 10 includes a laser source 12 that emits a beam that passes through a variable beam attenuator 14. Following variable beam attenuator 14, the beam is weakly focused by a lens 16 to illuminate a mask 18. Laser unit 10 further includes lenses 20 and 22 that image open apertures of mask 18 on a workpiece 24, namely a foil material. It will be understood that laser unit can include a diffractive optical element instead of mask 18.

Apparatus for laser processing a foil material workpiece, constructed in accordance with the present invention, further includes a workpiece holder 26 that is adapted to hold foil material workpiece 24 on a planar first face 27 of the workpiece holder. Workpiece holder 26 is disposed in the path of the laser beam developed by laser unit 10. For the embodiment of the invention illustrated by the drawings, workpiece holder 26 is stepped with the smaller portion fitted within and held by a boss 28.

Figure 2A:
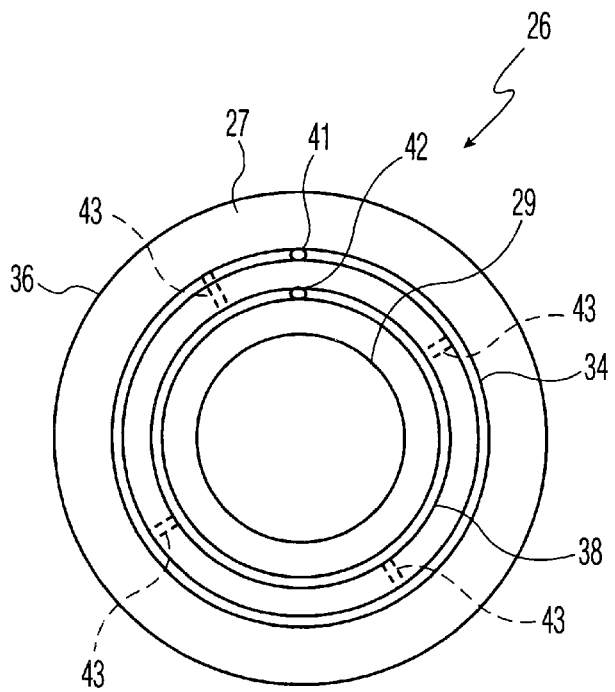
FIG. 2A is a top view of a preferred embodiment of a workpiece holder constructed in accordance with the present invention and useful in the FIG. 1 apparatus.
Figure 2B:
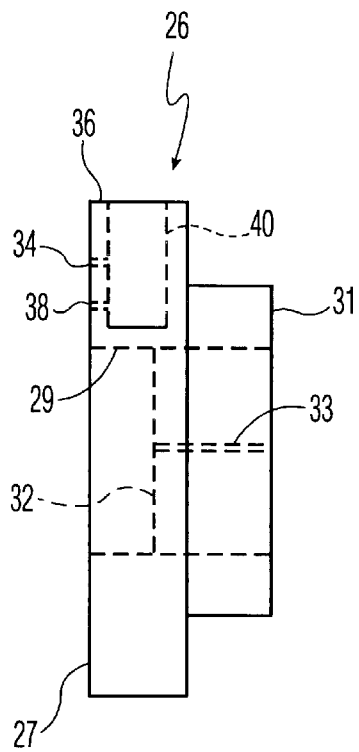
FIG. 2B is a side view of the FIG. 2A workpiece holder.

As shown in FIGS. 2A and 2B, workpiece holder 26 has a recess 29 in first face 27 of the workpiece holder. Recess 29 extends into the workpiece holder from first face 27.

In one embodiment of the present invention, recess 29 is a circular through hole that extends completely through the workpiece holder from first face 27 to a second face 31. In a second embodiment of the present invention, recess 29 is a blind hole that extends partially through workpiece holder 26 from first face 27. This is represented by dashed line 32 in FIG. 2B. A vent passage 33 is provided for pressure relief to equalize the pressure outside the foil material workpiece being held by the workpiece holder and the pressure inside the blind hole recess.

It is important that the laser beam not impinge upon workpiece holder 26 and damage the workpiece holder during laser processing of foil material workpiece 24 and, in the event that the laser beam impinges on the workpiece holder during laser processing of the foil material workpiece, the damage to the workpiece holder does not extend to beyond planar first face 27 of the workpiece holder which would result in the foil material workpiece no longer being planar and the foil material workpiece no longer being held flat throughout the extent of the foil material workpiece.

Workpiece holder 26 also has a groove 34 in first face 27 of the workpiece holder between recess 29 and a sidewall 36 at the periphery of the workpiece holder. For the embodiment of the invention illustrated by FIG. 2A, groove 34 is circular in shape. It is apparent that groove 34 can take other shapes, such as elliptical, square, or rectangular.

As shown in FIGS. 2A and 2B, workpiece holder 26 has a second circular groove 38 in first face 27 of the workpiece holder. Groove 38 also is located between recess 29 and sidewall 36 at the periphery of workpiece holder 26 and can take other shapes.

Workpiece holder 26 also has a vacuum passage 40 extending through the workpiece holder and opening at a first end into grooves 34 and 38 through openings 41 and 42, shown most clearly in FIG. 2A. A second end of vacuum passage 40 opens into sidewall 36 at the periphery of workpiece holder 26.

Apparatus for laser processing a foil material workpiece, constructed in accordance with the present invention, further includes means for applying a vacuum to the second end of vacuum passage 40. As shown in FIG. 1, such means can include a vacuum source 44, of conventional construction and operation, connected by suitable means to workpiece holder 26 at the second end of vacuum passage 40.

When a vacuum is applied from vacuum source 44 through vacuum passage 40 and openings 41 and 42 to grooves 34 and 38, portions of foil material workpiece 24 are pulled down into the grooves uniformly creating an even tension over recess 29 in the workpiece holder. The degree of tension is determined by the width of the grooves and the amount of the vacuum pressure that is applied. Having a single flat plane, the laser beam has the same focal distance across the foil material workpiece for the laser processing being performed and allows the same process performance criteria across the foil material workpiece. Workpiece holder 26 secures the foil material workpiece to the workpiece holder in a fashion that does not damage the foil material workpiece.

The workpiece holder 26 also includes optional grooves 43 that connect the grooves 34 and 38. The grooves 43 allow airflow from groove 34 or 38 to groove 38 or 34 and are implemented in the workpiece holder 26 to allow the foil material to be held in place even when one of the openings 41 and 42 is blocked. In this instance, vacuum pressure from the unblocked opening is applied to both grooves 34 and 38. One of the vacuum openings may be blocked, for example, when the foil material is pulled into the opening by the vacuum. To prevent the blocked vacuum opening from blocking the optional groove 43, it is desirable for the groove 43 to intersect the grooves 34 and 38 at locations other than those occupied by the vacuum opening.

Apparatus for laser processing a foil material workpiece, constructed in accordance with the present invention, preferably includes means for imparting relative movement between workpiece holder 26 and laser unit 10. Such means are represented in FIG. 1 by a motor 46 that, for the embodiment of the invention being described, causes workpiece holder 26 to move as the foil material workpiece is being processed by the laser unit. The present invention can be arranged to create the desired relative movement in three dimensions. It will be understood that the desired relative movement can be created by moving laser unit 10 rather than workpiece holder 26 or both the laser unit and the workpiece holder can be moved rather than only one of the two.

Figure 3:
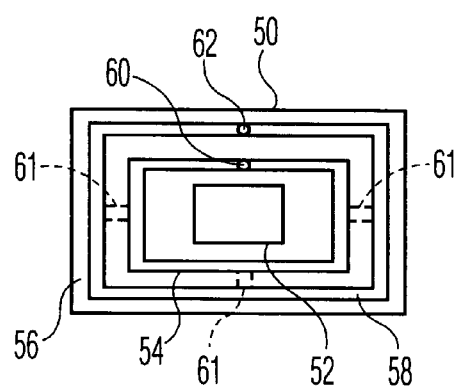
FIG. 3 is a top view of another preferred embodiment of a workpiece holder constructed in accordance with the present invention.

FIG. 3 shows another embodiment of a workpiece holder constructed in accordance with the present invention. This workpiece holder 50 has a rectangular recess 52 that can be a through hole or a blind hole and a first rectangular groove 54 in a face 56 of the workpiece holder between recess 52 and the sidewalls or periphery of the workpiece holder. For the embodiment of the invention illustrated by FIG. 3, groove 54 is rectangular in shape but can take other shapes.

As shown in FIGS. 3, workpiece holder 50 has a second rectangular groove 58 in face 56 of the workpiece holder. Groove 58 also is located between recess 52 and the periphery of workpiece holder 50 and can take other shapes.

Workpiece holder 50 also has a vacuum passage (not shown) extending through the workpiece holder and opening at a first end into grooves 54 and 58 through openings 60 and 62. A second end of this vacuum passage opens into a sidewall at the periphery of workpiece holder 50. This alternate embodiment also includes optional grooves 61 that connect the grooves 54 and 58. As with the grooves 43, described above, the grooves 54 and 58 allow vacuum pressure to be applied to both of the grooves 54 and 58 even when one of the openings 60 and 62 is blocked.

While in the foregoing there have been described preferred embodiments of the present invention, it should be understood by those skilled in the art that various modifications and changes can be made without departing from the true spirit and scope of the present invention.

What is claimed:

1. Apparatus for laser processing a foil material workpiece comprising:
   a laser unit for developing a laser beam for processing a foil material workpiece;
   a workpiece holder:
      (a) adapted to hold a foil material workpiece,
      (b) disposed in the path of the laser beam, and
      (c) having:
         (1) a recess in a first face of said workpiece holder extending into said workpiece holder from said first face thereof,
         (2) a groove in said first face of said workpiece holder between said recess and a sidewall at the periphery of said workpiece holder, and
         (3) a vacuum passage extending through said workpiece holder and opening at a first end into said groove; and
   means for applying a vacuum to a second end of said vacuum passage.

2. Apparatus for laser processing a foil material workpiece according to claim 1 wherein said second end of said vacuum passage opens into said sidewall of said workpiece holder.

3. Apparatus for laser processing a foil material workpiece according to claim 1 wherein said groove in said first face of said workpiece holder is circular.

4. Apparatus for laser processing a foil material workpiece according to claim 3 further including a second circular groove in said first face of said workpiece holder between said recess in said first face and said sidewall at the periphery of said workpiece holder and into which said vacuum passage opens.

5. Apparatus for laser processing a foil material workpiece according to claim 4 further including at least one further groove connecting the groove and the second groove such that when vacuum pressure is applied to one of the groove and the second groove it is applied to the other one of the groove and the second groove at least through the further groove.

6. Apparatus for laser processing a foil material workpiece according to claim 1 wherein said recess in said first face of said workpiece holder is a through hole that extends completely through said workpiece holder.

7. Apparatus for laser processing a foil material workpiece according to claim 1 wherein said recess in said first face of said workpiece holder is a blind hole that extends partially through said workpiece holder.

8. Apparatus for laser processing a foil material workpiece according to claim 1 further including means for imparting relative movement between said workpiece holder and said laser unit.

9. Apparatus for laser processing a foil material workpiece according to claim 1 wherein said groove in said first face of said workpiece holder is rectangular.

10. Apparatus for laser processing a foil material workpiece according to claim 9 wherein said recess in said first face of said workpiece holder is rectangular.

11. Apparatus for laser processing a foil material workpiece according to claim 10, further including a second rectangular groove in said first face of said workpiece holder between said recess in said first face and said sidewall at the periphery of said workpiece holder and into which said vacuum passage opens.

12. Apparatus for laser processing a foil material workpiece according to claim 11 further including at least one further groove connecting the groove and the second groove such that when vacuum pressure is applied to one of the groove and the second groove it is applied to the other one of the groove and the second groove at least through the further groove.

13. A foil material workpiece holder having:
a planar surface;
a recess in said planar surface;
a groove in said planar surface between said recess and a sidewall at the periphery of said workpiece holder; and
a vacuum passage extending through said workpiece holder and opening at a first end into said groove.

14. A foil material workpiece holder according to claim 13 wherein a second end of said vacuum passage opens into said sidewall at the periphery of said workpiece holder.

15. A foil material workpiece holder according to claim 13 wherein said groove in said planar surface of said workpiece holder is circular.

16. A foil workpiece holder according to claim 15 further including a second circular groove in said planar surface of said workpiece holder between said recess and said sidewall at the periphery of said workpiece holder and into which said vacuum passage opens.

17. A foil material workpiece holder according to claim 16 wherein said recess in said in said planar surface of said workpiece holder is a through hole that extends completely through said workpiece holder.

18. A foil material workpiece holder according to claim 16 wherein said recess in said planar surface of said workpiece holder is a blind hole that extends partially through said workpiece holder.

* * * * *